US005484355A

United States Patent [19]
King, II et al.

[11] Patent Number: 5,484,355
[45] Date of Patent: Jan. 16, 1996

[54] SYSTEM FOR THERAPEUTIC EXERCISE AND EVALUATION

[75] Inventors: Theodore I. King, II, Milwaukee; Barbara L. Basaj, Menomonee, both of Wis.

[73] Assignee: Smith & Nephew Roylan, Inc., Memphis, Tenn.

[21] Appl. No.: 130,584

[22] Filed: Oct. 1, 1993

[51] Int. Cl.$^6$ .................................................. A63B 21/00
[52] U.S. Cl. .............................. 482/4; 73/379.01; 482/5; 601/23
[58] Field of Search ................................... 482/900, 901, 482/1–8; 73/379.01–379.03, 379.06, 379.08; 601/23, 33, 39, 40

[56] References Cited

U.S. PATENT DOCUMENTS

| | | | |
|---|---|---|---|
| 3,400,793 | 9/1968 | Norris et al. | |
| 3,807,729 | 4/1974 | Sigma | |
| 4,270,032 | 5/1981 | Dobberpuhl | |
| 4,433,364 | 2/1984 | Noble | |
| 4,489,938 | 12/1984 | Darzinskis | |
| 4,558,864 | 12/1985 | Medwedeff | |
| 4,630,817 | 12/1986 | Buckley | 482/1 X |
| 4,885,687 | 12/1989 | Carey | |
| 4,925,189 | 5/1990 | Braeunig | |
| 5,054,771 | 10/1991 | Mansfield | 482/8 |
| 5,076,584 | 12/1991 | Openiano | |
| 5,104,119 | 4/1992 | Lynch | 482/8 X |
| 5,230,672 | 7/1993 | Brown et al. | 482/8 X |
| 5,308,296 | 5/1994 | Eckstein | 482/8 X |

OTHER PUBLICATIONS

King, Theodore I., II, *Hand Strengthening With a Computer for Purposeful Activity*, Am. J. of Occupational Therapy, vol. 47, No. 7 (Jul. 1993), pp. 635–637.
King, Theodore I., II, and Walsh, William W., *Computers in Hand Therapy Practice*, J. of Hand Therapy (Jul.–Sep. 1990), pp. 157–159.
Steinbeck, Thomas M., *Purposeful Activity and Performance*, Am. J. of Occupational Therapy, vol. 40, No. 8 (Aug. 1986), pp. 529–534.
Spicer, Marti McGrath and McMillan, Susan L., *Computers and Occupational Therapy*, Am. J. of Occupational Therapy, vol. 41, No. 11 (Nov. 1987), pp. 726–732.
Pashley, Joan, *Grip Strengthening with Adapted Computer Switches*, Am. J. of Occupational Therapy, vol. 43, No. 2 (Feb. 1989), pp. 121–123.
Kircher, Marjorie A., *Motivation as a Factor of Perceived Exertion in Purposeful versus Nonpurposeful Activity*, Am. J. of Occupational Therapy, vol. 38, No. 3 (Mar. 1984), pp. 165–170.
Florey, Linda L., *Intrinsic Motivation: The Dynamics of Occupational Therapy Theory*, Am. J. of Occupational Therapy, vol. 13, No. 4 (Jul.–Aug. 1969), pp. 319–322.
Hinojosa, Jim, Sabari, Joyce, Rosenfeld, Mark S., *Purposeful Activities*, Am. J. of Occupational Therapy, vol. 37, No. 12 (Dec. 1983), pp. 805–806.

(List continued on next page.)

Primary Examiner—Richard J. Apley
Assistant Examiner—Glenn E. Richman
Attorney, Agent, or Firm—Pravel, Hewitt, Kimball & Krieger

[57] ABSTRACT

Computer exercise system including at least two exercise devices coupled to a computer through a serial mouse port. These devices provide on/off signals to the computer indicating when the devices have been fully compressed or extended. The computer runs a program that responds to these inputs by requesting activation of the devices for a predetermined number of repetitions and a predetermined number of sets, with a preselected amount of delay between repetitions and sets. Alternatively, a game program is provided that requires patient input from one exercise device in order to perform a first function and requires patient input from the other exercise device to perform a second function. At the start of the game program, it is selected which exercise device is to provide the more frequently needed function.

12 Claims, 8 Drawing Sheets

OTHER PUBLICATIONS

English, Carroll B., *Computers and Occupational Therapy*, Am. J. of Occupational Therapy, vol. 29, No. 1 (Jan. 1975), pp. 43–47.

Breines, Estelle, *An Attempt to Define Purposeful Activity*, Am. J. of Occupational Therapy, vol. 38, No. 8 (Aug. 1984), pp. 543–544.

Cromwell, Florence S., Editor, *Computer Applications in Occupational Therapy*, Occupational Therapy in Health Care, vol. 3, Nos. ¾ (1986–87), pp. 20–53, 68–84, 153–168, 175–185.

Advertisement from J. of Hand Therapy, vol. 6, No. 3 (Jul.–Sep. 1993).

1

SYSTEM FOR THERAPEUTIC EXERCISE AND EVALUATION

BACKGROUND OF THE INVENTION

1. Field of the Invention

The invention relates to computer-controlled therapeutic exercise systems, and more particularly to computers running software responsive to inputs from therapeutic exercise devices.

2. Description of the Related Art

The fields of occupational and physical therapy have seen great strides made over the past few years. Injuries that once would have crippled a person for life can now be treated and corrected so that an injured limb is virtually as good as new.

This is particularly true of joint related injuries and degeneration. Not long ago, injuries to and degeneration of the fingers, wrists, elbows, knees, and other joints and their related tendons usually resulted in a substantial weakening of that joint for the rest of the patient's life. Advances in the development of artificial joints, as well as in other areas of treatment such as arthroscopic surgery, now result in almost complete recovery from such injuries or other degenerative conditions, such as arthritis.

But what these advances have not eliminated is the need for very active physical and occupational therapy to promote recovery from these procedures and to strengthen the treated joints. While the treatments have been radically improved, the subsequent therapy is typically a tedious and painful endeavor for the patient, with the end results depending on the patient's perseverance in following the course of therapy.

Devices used in joint related therapy are well-known in the art, and include knee, hand, and finger exercisers, as well as other upper and lower extremity exercisers. The course of therapy using these devices typically involves an arduous routine of repetitive motion exercises with increased resistance as the treated area regains strength.

It would be greatly desirable to relieve the patient of some of the tedium of these courses of therapy and to distract the patient from the pain involved in performing the required exercises. Also, any motivation that can be provided to the patient in undertaking the course of therapy would also be desirable.

Further, joint related treatment is often performed on two or more joints simultaneously, such as treating a left and right wrist or multiple fingers. Thus, it would be further desirable to exercise both treated joints simultaneously.

SUMMARY OF THE INVENTION

In a system constructed according to the invention, a patient follows a repetitive motion course of therapy using two or more exercise devices, one for each area under treatment. These devices are fitted with on/off switches, such that full compression or extension of the exercise device provides a corresponding signal.

The signals from these two devices are then fed into a computer running therapeutic exercise software according to the invention. This software responds to the signals from the exercise devices, giving the patient visual feedback whenever the patient fully completes a requested activation of the exercise device.

A system according to the invention uses the left and right mouse button inputs of the computer and includes adapter hardware to provide one exercise device on/off signal as the left input and another exercise device on/off signal as the right input.

The computer software is either an exercise program that displays feedback from the exercise routine that the patient is undertaking or a game program requiring patient activation. The exercise program provides visual feedback, both requesting the patient to perform a repetition of the exercise routine and indicating the patient's progress towards completing the requested exercise routine.

Alternatively, a game program responsive to patient input is substituted for the exercise program. The computer game program requires the patient to perform repetitions using the exercise devices to activate game functions.

The game program allows increased exercise of one affected area compared to the other. This is done by mapping one of the exercise device inputs to a function in the game program that requires more frequent activation.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

Figure 1:
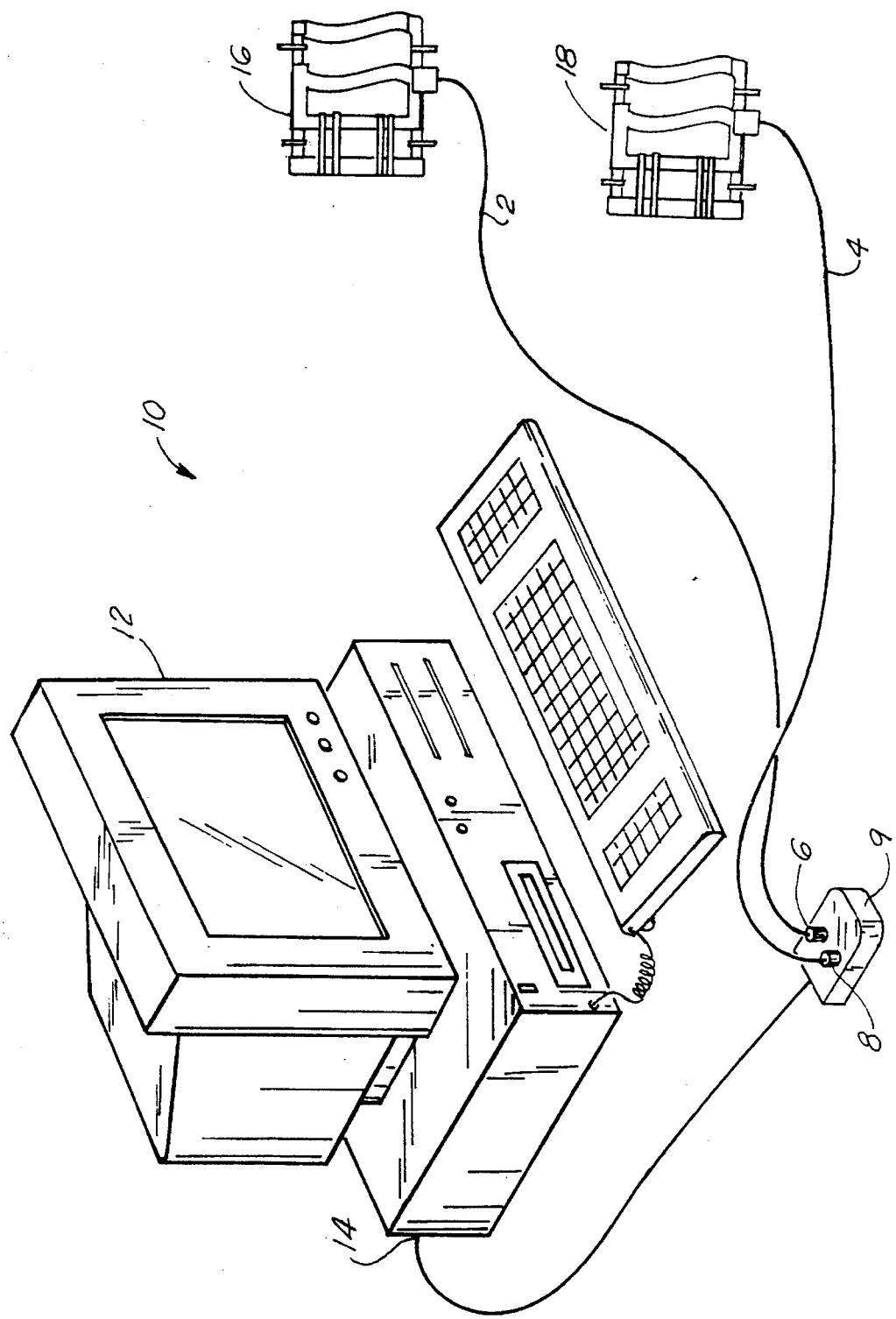
FIG. 1 shows a therapeutic exercise system constructed according to the invention.

Turning now to the drawings, FIG. 1 shows a typical therapeutic exercise system 10 constructed according to the invention. A computer 12 is provided to run an exercise program or game program discussed below in conjunction with FIGS. 6A–B, 7, and 8. The computer 12 is preferably compatible with an IBM PC by International Business Machines Corp., but could be any other computer system, such as a Apple IIe by Apple Corp. or a Nintendo Entertainment System by Nintendo Corp. The computer 12 preferably has a serial input port 14 for receiving signals from a mouse. The computer 12 uses inputs from this port 14, preferably in the form of left and right mouse button signals, or left and right joy-stick signals on an Apple IIe, in running the programs to provide therapeutic exercise.

A right exercise device 16 and a left exercise device 18 provide signals over input lines 2 and 4 to input jacks 6 and 8, which then provide the signals to a serial adapter 9. The serial adapter 28 is further discussed below in conjunction with FIG. 5. The serial adapter 9 then converts these signals into a serial signal (preferably compatible with a three button Kraft or Logitech mouse) suitable for input to the computer 12 through the serial input port 14.

The exercise devices 16 and 18 are shown in FIG. 1 as being hand exercise units, such as the Rolyan® Ergonomic Hand Exerciser by Smith & Nephew Rolyan, Inc. These could instead be any other type of repetitive motion or rotational exercise device that has a full compression, extension, or rotation that the computer 12 can sense as an on/off signal For example, "clothespin" like pinchers could be used to exercise fingers. In any case, the exercise devices 16 and 18 on activation provide an output signal in the form of an electrically closed switch through the input jacks 6 and 8 to the serial adapter 28. The exercise devices 16 and 18 are further discussed below in conjunction with FIGS. 2, 3, and 4.

Of course, rather than having input lines 2 and 4, the exercise devices 16 and 18 could instead be coupled to the serial adapter 9 using an infrared transmitter, for example, or some other type of communications link known to the art of digital design. Similarly, the serial adapter 9 could instead be integrated into the computer 12, or linked with an infrared or other communications link to the computer 12, rather than through the serial input port 14. Although the described embodiment provides mouse-button compatible signals through the serial adapter 9, any communications link providing on/off signals to the computer 12 would suffice.

It will be noted that the exercise devices 16 and 18 could include a hysteresis switch, requiring the patient to fully release the exercise device before again gripping it. This would require the patient to perform full movements for each succeeding activation.

Figure 2:
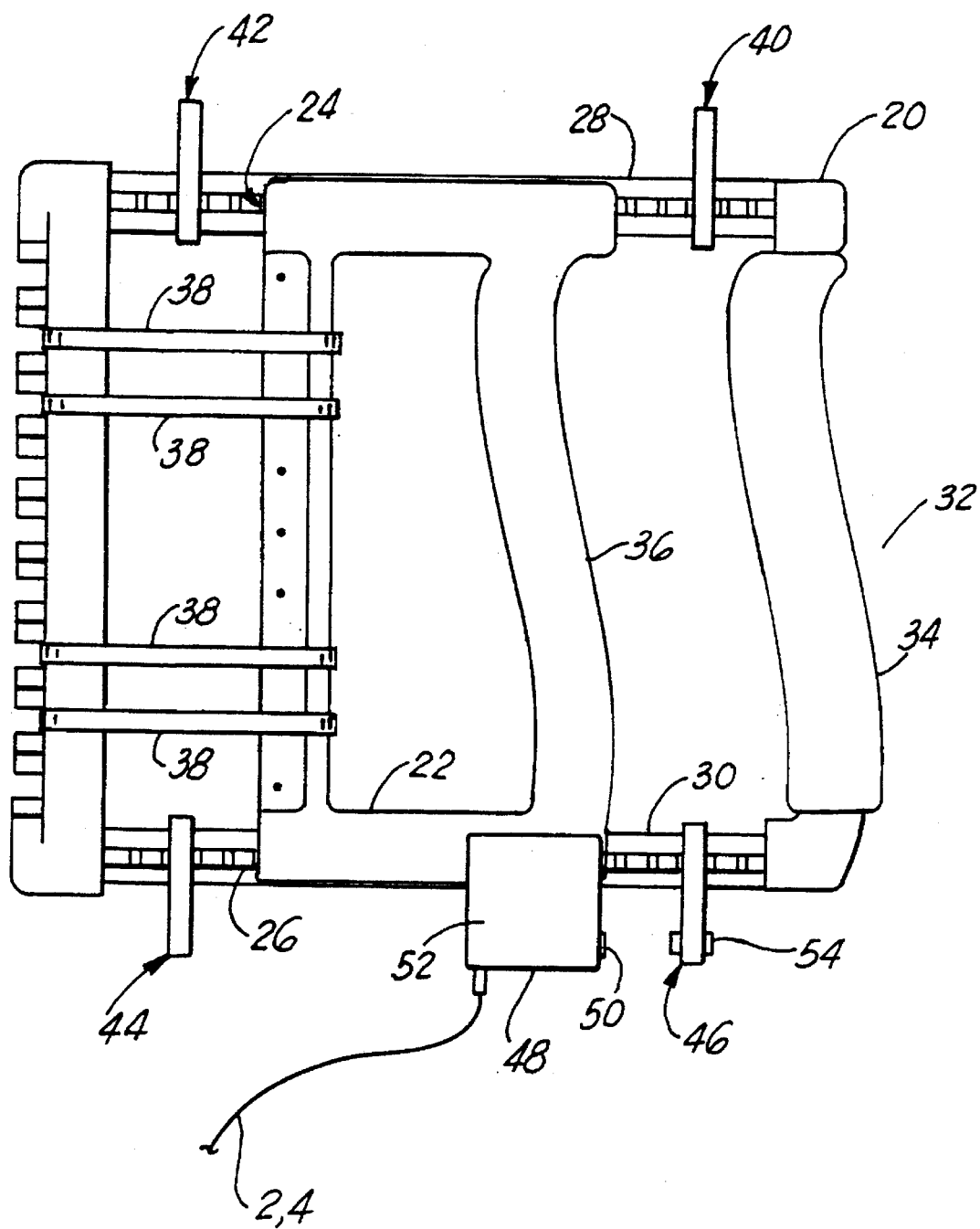
FIG. 2 is a more detailed side view of a hand exercise device to be used with a therapeutic exercise system constructed according to the invention.

FIG. 2 is a side view showing further details of the exercise device 16 or 18. The exercise device 16 or 18, as shown in FIG. 2, is for hand therapeutic exercise, but again could be any other sort of repetitive motion exercise device.

The exercise device 16 or 18 illustrated in FIG. 2 has a frame 20 on which a movable inner frame 22 slides. Troughs 24 and 26 on the movable inner frame 22 slide on shafts 28 and 30 of the frame 20. The exercise device 16 or 18 has a hand grip 32, which preferably includes a stationary portion 34 on the frame 20 and a retractable portion 36 on the movable inner frame 22.

In practice, the patient grasps the hand grip 32 on the exercise device 16 or 18 and repetitively squeezes the retractable portion 36 to the stationary portion 34. Resistance elements 38, which are preferably a series of rubber bands, resists this squeezing. The resistance elements 38 can be increased or decreased to adjust for a particular patient's therapeutic needs.

The frame 20 preferably has attached range limiting clips 40, 42, 44, and 46 to prevent excessive motion and to adjust for a particular patient's hand size and exercise needs. These adjust the range of extension and compression of the moveable inner frame 22 on the frame 20.

A signal source 48 detects full compression of the grip 32, providing a signal to the serial adapter 28 through the input line 2 or 4 and input jack 6 or 8. The signal source 48 includes a proximity switch 50, which electrically closes on full compression of the exercise device 16 or 18. The proximity switch 48 is enclosed in a proximity switch housing 52.

The range limiting clip 46 includes a magnet 54, which activates and deactivates the proximity switch 50. When the patient squeezes the grip 32 such that the magnet 54 is close to the proximity switch 50, the proximity switch 50 electrically closes, providing a signal transition on the output line 2 or 4.

Figure 3B:
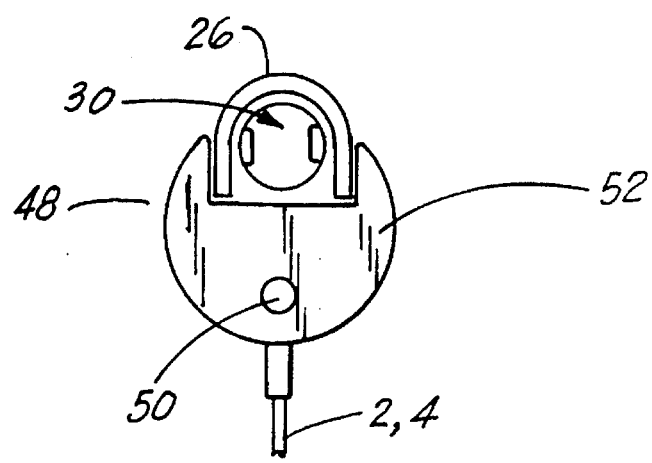
FIGS. 3A, 3B, and 4 are details of the proximity switch of the hand exercise device of FIG. 2.
Figure 3A:
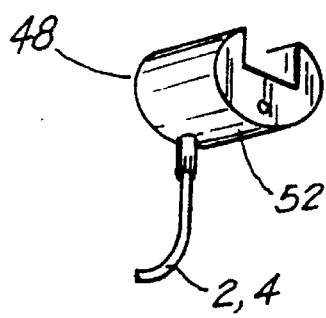
Figure 4:
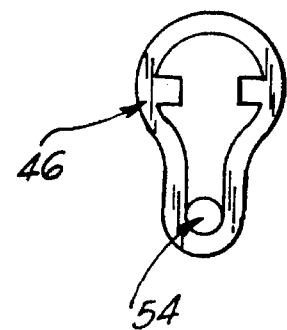

FIGS. 3A, 3B, and 4 provide further details of the signal source 48 and the range limiting clip 46 with the magnet 54. FIG. 3A shows an isometric view and FIG. 3B shows an end view of the signal source 48. A proximity switch housing 52 is clipped to the outside of the trough 26 on the lower side of the movable frame 22, thus surrounding the shaft 30. The proximity switch housing 52 encases the proximity switch 50, and provides the input line 2 or 4 to the input jack 6 or 8.

FIG. 4 shows further details of the range limiting clip 46 with the magnet 54. As can be seen, the clip 46 clips onto the shaft 30 by tension provided by the end of the clip 36 towards the magnet 54. Both the proximity switch housing 52 and the range limiting clips 40, 42, 44, and 46 are preferably made of a rigid plastic.

One will appreciate that a variety of hardware could be used to provide a signal instead of the described signal source 48 and magnet 54.

Figure 5:
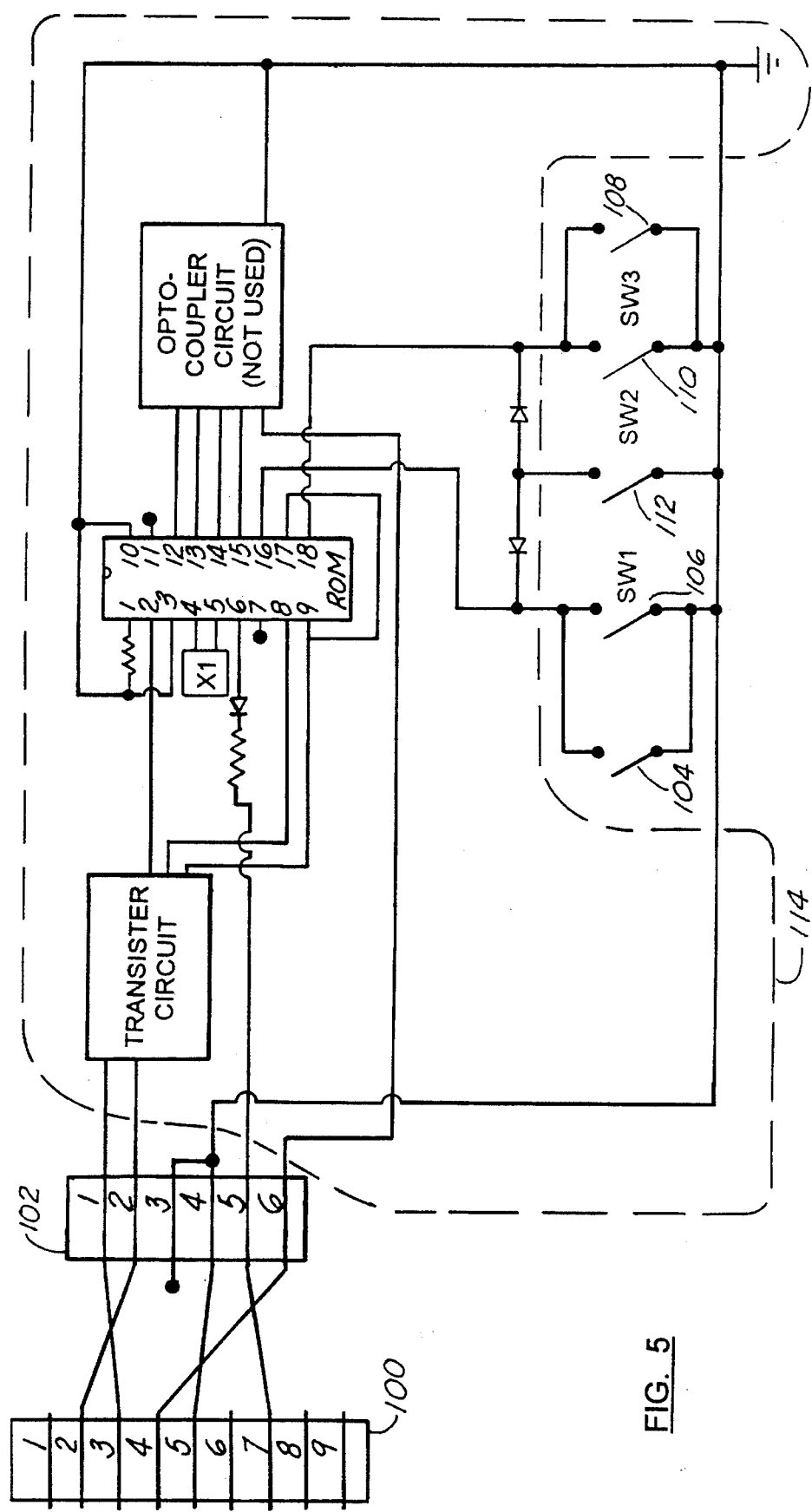
FIG. 5 is a schematic diagram illustrating the circuitry used to interface between exercise devices and the computer in the therapeutic exercise system constructed according to the invention.

FIG. 5 is a schematic diagram illustrating circuitry contained in the serial adapter 28 for converting the signals on the input lines 2 and 4 to a signal suitable for the serial input port 14. The computer 12 preferably has mouse driver software sensing left and right mouse button activation over the serial link, and the schematic diagram of FIG. 5 provides circuitry to convert the signals on the input lines 2 and 4 to such left and right mouse button signals.

A serial connector 100 is provided for connection to the serial input port 14. The lines on the serial connector 100 are then provided by a buffer 102, with the mapping of the lines well-known to those in the field of digital circuit and computer system design.

A left proximity switch 104 corresponds to the proximity switch 50 of FIG. 2, and provides an open/close switch connected in parallel with a left mouse button switch 106 normally activated by the left button on a mouse. Similarly, a right proximity switch 108 corresponds to the proximity switch 50, but on the right exercise device 18, and is connected in parallel with a right mouse button switch 110. A typical mouse further contains a middle button switch 112, which provides further functionality and is used in the disclosed embodiment to end the currently running program. The middle button switch 112 could instead be attached in parallel to a third proximity switch 50, or could be left unused. The remaining circuitry 114 is typical mouse hardware as is well-known in the field of digital computer design.

Figure 6A:
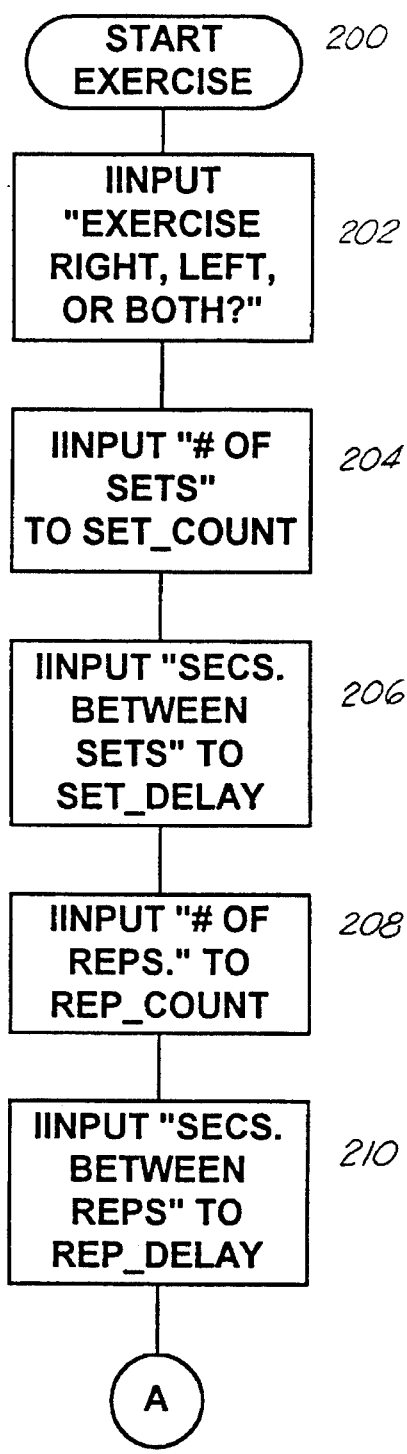
FIGS. 6A and 6B are flowcharts of a typical exercise program.
Figure 6B:
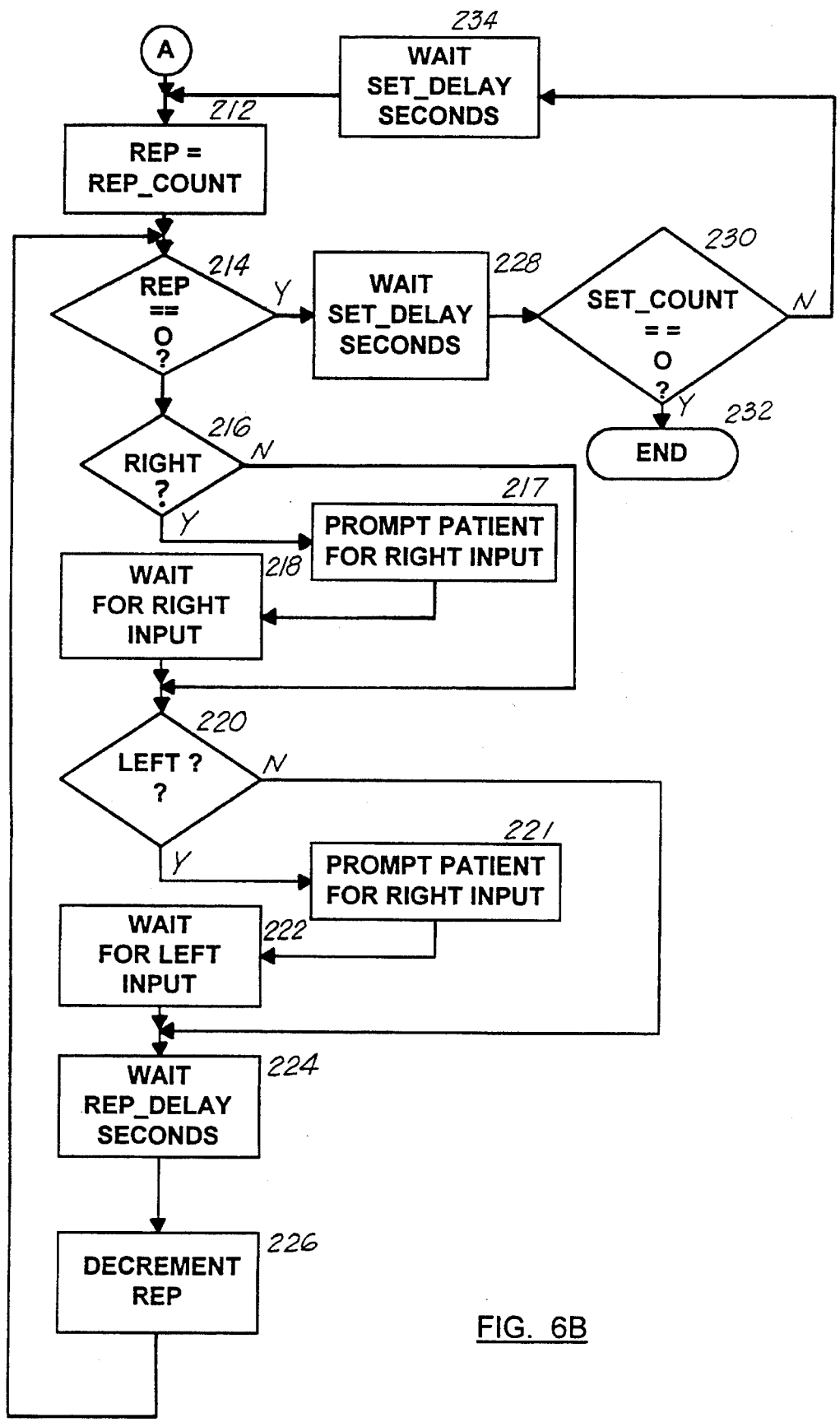

FIGS. 6A and 6B are flowcharts of typical software used to provide an exercise program in the system 10 according to the invention. This exercise program motivates the patient to perform an exercise routine consisting of a selected number of sets of a selected number of repetitions per set.

An EXERCISE program 200 begins at step 202, where it asks the patient or the patient's therapist (the "user") whether to use the right exercise device 16, the left exercise device 18, or both. The user's response is then stored in logical variables RIGHT and LEFT, which are appropriately set true or false. If the response was "both," RIGHT and LEFT are both set true.

Control then proceeds to step 204, where the user is asked to enter the number of sets to repeat in this exercise routine. The response is stored in a variable SET_CNT. Then, at step 206 the user is asked to enter the number of seconds to delay between sets, and the response is stored in a variable SET_DELAY.

Control proceeds to step 208, where the user is asked to enter the number of repetitions per set, which is stored in a variable REP_CNT, and then to step 210, where the user is asked to enter how many seconds to delay between repetitions, which is stored in a variable REP_DELAY.

The EXERCISE program 200 then begins the actual therapy routine in FIG. 6B at step 212, where it sets a repetition count local variable REP equal to REP_CNT.

Proceeding to step 214, the EXERCISE program 200 determines if REP is equal to 0. If not, there are exercise repetitions still required from the patient in this set, so the EXERCISE program 200 proceeds to step 216, where it determines if RIGHT is true, indicating that the patient should exercise using the right exercise device 16. If RIGHT is true, control proceeds to step 217, where a patient prompt for right input is displayed on the screen of the computer 12, and then to step 218, where the EXERCISE program 200 waits for the patient to compress the right exercise device 16, thus activating the proximity switch 50. This is sensed by detecting from a mouse device driver whether the right "mouse button" has been activated. When this occurs, that indicates the patient has managed to fully compress the grip 32, and has thus completed one repetition using the right exercise device 16.

Control then proceeds from step 218, or step 216 if RIGHT was false, to step 220, where LEFT is checked to determined if it is true, and a function corresponding to steps 216 through 218 is performed at steps 220 through 222 for the left exercise device 18.

Control then proceeds from step 220 or step 222 to step 224, where the EXERCISE program 200 waits for REP_DELAY seconds. This allows the patient to rest between each repetition. Proceeding to step 226, REP is decremented, and control then loops to step 214, where REP is again compared to zero. If not yet zero, steps 216 through 226 are repeated, as repetitions remain to be completed in this set.

If at step 214 REP is not equal to zero, the first set of repetitions has been completed, so control proceeds to step 228, where SET_CNT is decremented, indicating one set has been completed.

Control then proceeds to step 230, where SET_CNT is compared to zero. If zero, this indicates the requested number of sets has been completed, so the EXERCISE program 200 ends at step 232. If SET_CNT is not equal to zero at step 230, control proceeds to step 234, where the EXERCISE program 200 waits for SET_DELAY seconds to allow the patient to rest between sets and then passes control to step 212, where REP is reset to the REP_CNT value for another set of repetitions.

If more exercise is desired for one of the exercise devices 16 or 18 than the other, the EXERCISE program 200 can include steps in the loop of steps 214–226 requiring more frequent activation of the desired device 16 or 18. For example, two repetitions could be required at step 216 or step 220 instead of one or more sets could be required of the desired device 16 or 18.

Figure 7:
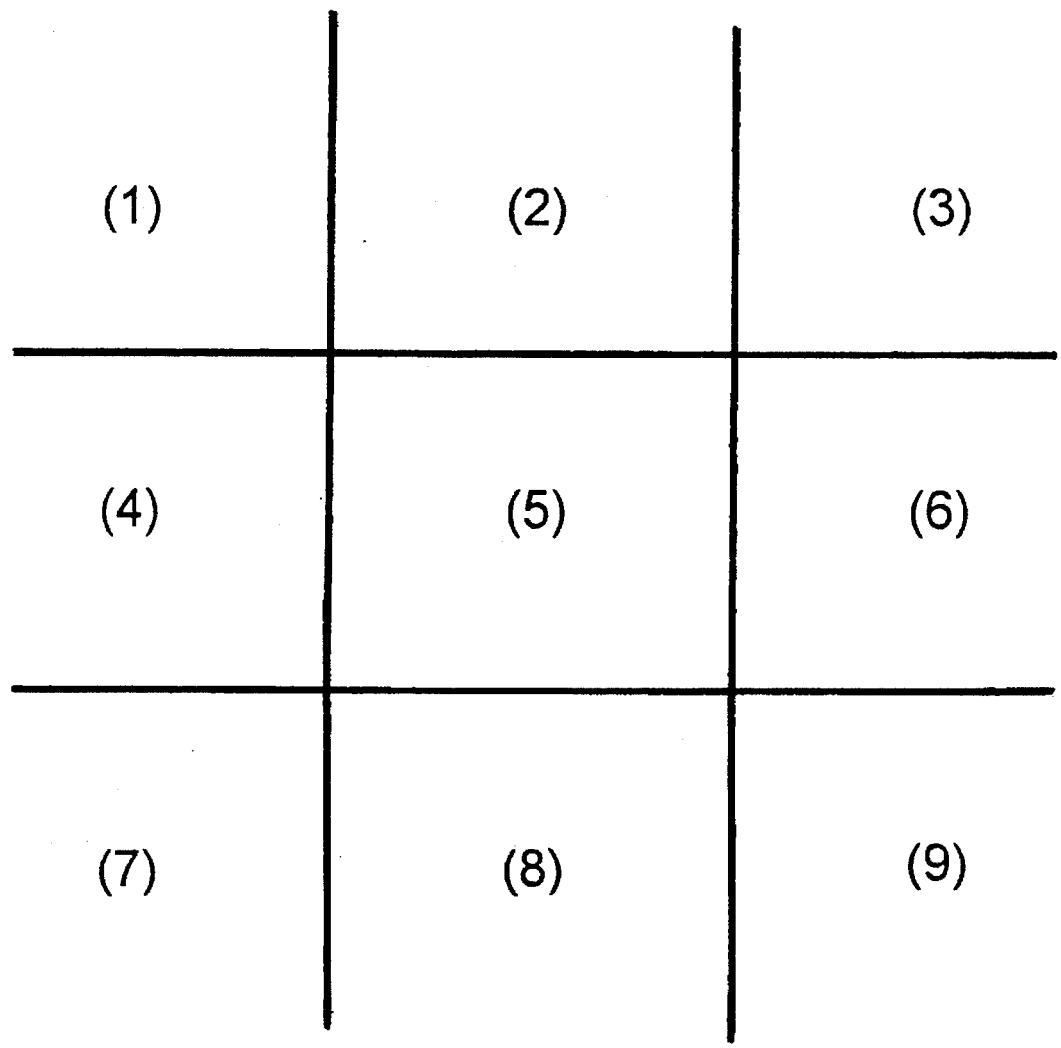
FIG. 7 is a typical screen display of a game program for use in the therapeutic exercise system according to the invention.

Alternatively, FIG. 7 shows a display of a typical game program that the patient could play using the left and right exercise devices 16 and 18 instead of simply performing a prompted therapeutic exercise routine as discussed in FIGS. 6A and 6B. FIG. 7 shows a tic-tac-toe board with each of the squares numbered. The patient first indicates which of the left or right exercise devices 16 and 18 should be more actively used. This is set to the "move" function of the game program. The other exercise device 16 or 18 is then set to the "enter" function of the game.

The patient indicates where to place the first X by activating the "move" exercise device 16 or 18 an appropriate number of times to move a pointer to the desired square. For example, to begin with square 5, the patient activates the "move" exercise device 16 or 18 four times— first to square 2, then to 3, then to 4, and then to 5. The patient then activates the other exercise device 16 or 18, thus performing the "enter" function, causing an X to be placed in square 5. The program then responds, either randomly or with predetermined logic, and places an 0 in some square. The patient then repeats the functions of moving and entering an X in a desired square until the game is over. Thus, the patient must, on average, activate the "move" device more often than the "enter" device.

Figure 8:
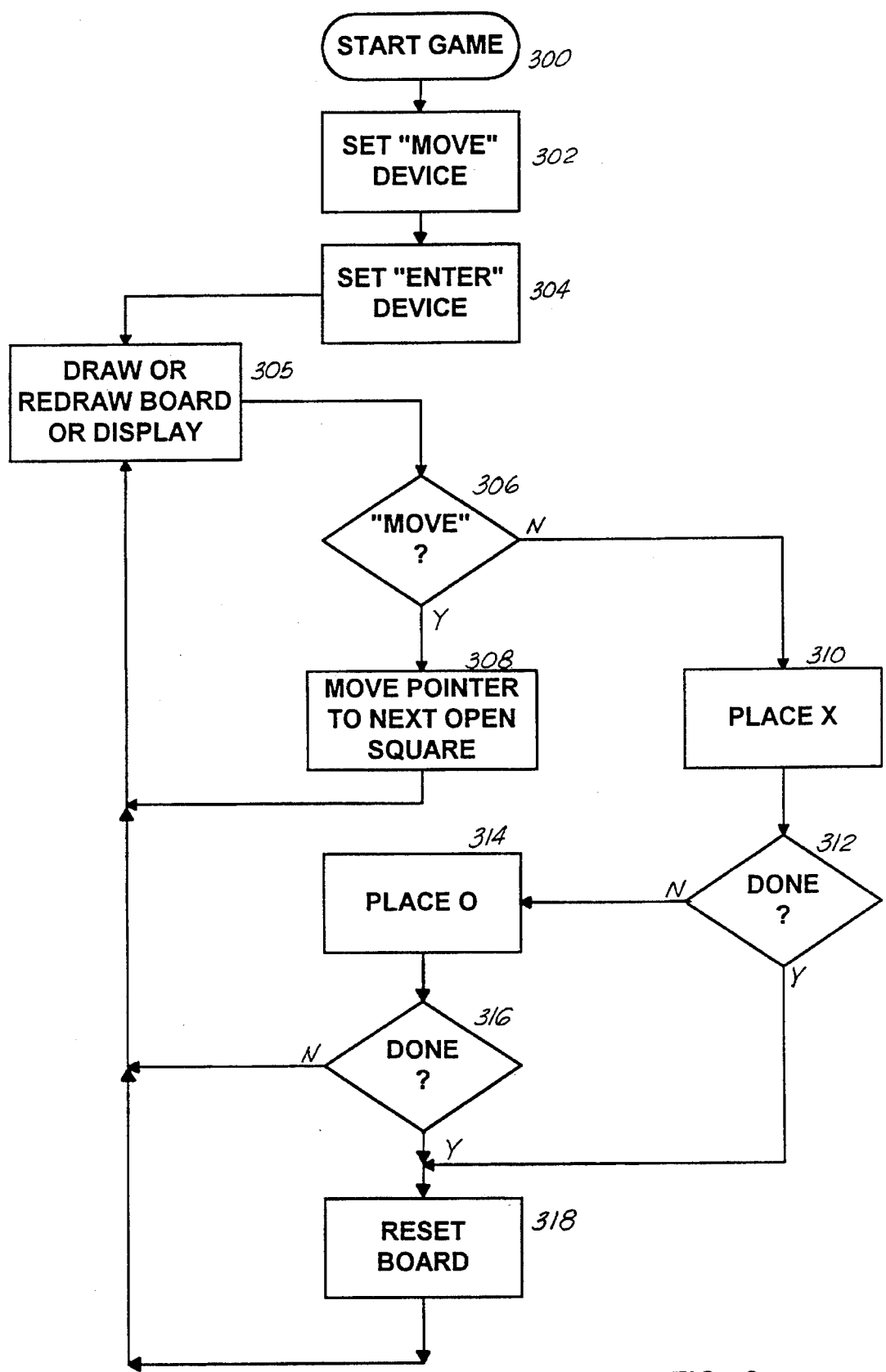
FIG. 8 is a flowchart of a typical game program that provides and uses the display of FIG. 7.

FIG. 8 is a flowchart of typical software used to implement the above-described tic-tac-toe game. A GAME program 300 begins at step 302 where, in response to user input, it sets the "move" device to be either the right exercise device 16 or the left exercise device 18. Control then proceeds to step 304, where the other exercise device 16 or 18 is set to be the "enter" device.

The GAME program 300 then proceeds to step 305, where it draws or redraws the board as shown in FIG. 7 on the screen of the computer 12. Then, at step 306, it waits for patient input from either the "move" device or the "enter" device. Assuming this is the start of the tic-tac-toe game, a pointer will have been displayed on the screen as shown in FIG. 7, indicating that the first square is selected. When the GAME program 300 detects an input through the mouse drivers from either the left or right mouse buttons, corresponding to the "move" or "enter" devices or vise versa, the GAME program 300 then determines which device was activated at step 306. If the "move" device was activated, control proceeds to step 308, where the GAME program 300 moves the pointer to indicate the next open square, here square 2. Control then loops to step 305.

Once the patient has positioned the pointer in the square the patient wishes to select, the patient activates the "enter" device. This is detected as not being an activation of the "move" device at step 306, so control proceeds from step 306 to step 310, where an "X" is placed in the selected square. Control then proceeds to step 312, where the GAME program 300 determines if the game is over, either by all the squares having been filled or by the patient having won.

If the game is not over, control proceeds to step 314, where the GAME program 300 places an "O" in an appropriate square, either in a random fashion or preferably using simple logic. Control then proceeds to step 316, where the GAME program 300 again determines if the game is over. If the game is over at either step 312 or step 316, control proceeds to step 318, where the board is reset. If the game is not over at step 316, and in any case from step 318, control then loops to step 305, either to continue the current game or to start a new game.

Both the exercise program and the game program provide visual feedback to patients showing how they are doing and distracting the patient from any pain. Occupational therapy has been shown to be most effective when the patient is engaged in "purposeful activity" rather than rote exercise; these programs provide that purposeful activity. Any other number of games could be implemented in a similar fashion as the tic-tac-toe game, such as Hangman, Pyramids of Hanoi, Twenty-One, Trivia, Jump-the-Pegs, etc.

As an example, in the Twenty-One game, the exercise device 16 or 18 that is desired to receive more exercise implements the "draw" function, whereas the other performs the "stand" function. Further, a new hand is selected by using the exercise device 16 or 18 requiring more exercise.

In the Jump-A-Peg game, the patient uses the exercise devices 16 and 18 to move pegs on a triangular board (with the computer removing those pegs that are jumped) in an attempt to end with as few pegs left as possible in the quickest period of time. The exercise device 16 or 18 that is to receive more exercise is used to choose the peg to move, as well as to choose the empty space into which to move that peg. The other exercise device is used to perform the entry function, selecting the peg or space chosen with the first exercise device 16 or 18.

The Pyramids of Hanoi game requires the patient to move a pyramid of progressively smaller discs from one tower to another. There are five pieces to the pyramid which can only be moved one at a time. Only the top piece can be moved from one tower onto one of two other towers, and a larger piece can never be placed on a smaller piece. One of the exercise devices 16 or 18 is used to choose the source and destination towers, and the other exercise device 16 or 18 performs the enter function, selecting the tower chosen with the first exercise device 16 or 18.

In the Trivia game, the patient chooses a category, and 20 multiple-choice questions are asked. A question is asked, and one of the exercise devices 16 or 18 must then be activated to display the possible answers. That same exercise device 16 or 18, which is to receive more exercise, is then used to choose between three possible answers. The other exercise device 16 or 18 then enters that chosen response, and further requests the next question. If balanced exercise is desired, the function for each of the exercise devices 16 or 18 can be switched for each question.

These games further can include a timer to time how quickly the game was completed.

It will be readily apparent that a variety of other games can be implemented requiring more or less distribution of the exercise between the left and right exercise devices 16 and 18. For example, a ball drop game requires the patient to move a ball dropped from the top of the screen left or right to fall into appropriate sized buckets at the bottom. By starting the balls on average more to one side or the other side of the screen, exercise using one of the two exercise devices 16 or 18 can be increased relative to the other.

Another game is a missile game, in which missiles are dropped from the top of the screen, and the patient moves a barrier from the left to the right to protect a city. Activity can be distributed by requiring more "effort"—i.e., exercise device 16 or 18 activations—to move the barrier in one direction as opposed to the other.

In a bomb-threat game, bombs are located throughout a city displayed on the screen. One of the exercise devices 16 or 18 aims the direction in which a "bomb squad" will move; the other device then moves the squad in that direction. Thus, the second of the exercise devices 16 or 18 is typically used more often. Alternatively, the patient can keep the grip "closed" in order to continuously move in a certain direction, thus providing a different type of continuous exercise.

In a downhill slalom game, the patient moves a skier left and right by activating the exercise devices 16 and 18.

Another game is a catch game, in which balls are dropped from the top of the screen, and the patient controls a container at the bottom of the screen, moving the container left or right. If the container is programmed to "wrap around" at the bottom of the screen—i.e., immediately move from all the way right to all the way left—the patient can be required to move in one direction more often than another by dropping each succeeding ball nearest the direction in which it is desired the patient activate the exercise device 16 or 18.

These programs thus provide multiple area exercise while reducing the patient's focus on pain and motivating the patient to complete a course of exercise therapy. Further, a more affected area can be more strenuously exercised.

The foregoing disclosure and description of the invention are illustrative and explanatory only, and various changes in the size, shape, materials, components, circuit elements, wiring connections and contacts, as well as in the details of the illustrated systems, devices, and circuitry and construction and method of operation may be made without departing from the spirit of the invention.

What is claimed is:

1. A therapeutic exercise system for patient exercise of a patient, comprising:

a computer for running a program, said computer having a first input for a first on/off signal and having a second input for a second on/off signal;

a first exercise device coupled to said first input of said computer, said first exercise device adapted for providing said first on/off signal to said first input of said computer responsive to activation by the patient through patient exercise using said first exercise device;

a second exercise device coupled to said second input of said computer, said second exercise device adapted for providing said second on/off signal to said second input of said computer responsive to activation by the patient through patient exercise using said second exercise device;

an exercise motivating program for running on said computer, said exercise motivating program providing feedback to the patient responsive to said first on/off signal indicating activation of said first exercise device by patient exercise and responsive to said second on/off signal indicating activation of said second exercise device by patient exercise.

2. The therapeutic exercise system of claim 1, wherein said exercise motivating program is an exercise program.

3. The therapeutic exercise system of claim 2, wherein said exercise program requires the patient to activate said first and second exercise devices through patient exercise, requiring the patient to activate through patient exercise a preselected one of said first and second exercise devices more often than the other of said first and second exercise devices.

4. The therapeutic exercise system of claim 1, wherein said exercise motivating program is a game program.

5. The therapeutic exercise system of claim 4, wherein said game program requires the patient to activate through patient exercise said first and second exercise devices, requiring the patient to activate through patient exercise a preselected one of said first and second exercise devices more often than the other of said first and second exercise devices.

6. The therapeutic exercise system of claim 1, wherein said first exercise device is a hand exercise device.

7. The therapeutic exercise system of claim 6, wherein said second exercise device is a hand exercise device.

8. The therapeutic exercise system of claim 1, wherein said first exercise device is a finger exercise device.

9. The therapeutic exercise system of claim 8, wherein said second exercise device is a finger exercise device.

10. The therapeutic exercise system of claim 1, wherein said first exercise device is an upper extremity exercise device.

11. The therapeutic exercise system of claim 10, wherein said second exercise device is an upper extremity exercise device.

12. A method of motivating patient exercise in a system including a computer for running an exercise motivating program responsive to first and second on/off signals, and first and second exercise devices for activation by the patient through patient exercise coupled to the computer and providing the first and second signals to the computer upon activation, comprising the steps of:

(a) prompting the patient for which of the first or second exercise devices to require more frequent activations;

(b) performing a first predetermined action responsive to said first or second on/off signal corresponding to activation by the patient through patient exercise of the first or second exercise device requiring more frequent activation by the patient through patient exercise as determined in step (a);

(c) performing a second predetermined action responsive to said first or second signal corresponding to activation by the patient through patient exercise of the first or second exercise device other than the first or second exercise device requiring more frequent activation by the patient through patient exercise as determined in step (a); and (d) wherein said first predetermined action is performed on the average more often than said predetermined action.

* * * * *